Fig. 2.

Patented May 23, 1944

2,349,636

UNITED STATES PATENT OFFICE 2,349,636

SUPERVISORY CONTROL SYSTEM

Maurice E. Reagan, Pittsburgh, Pa., assignor to Westinghouse Electric & Manufacturing Company, East Pittsburgh, Pa., a corporation of Pennsylvania Application February 21, 1942, Serial No. 431,892

15 Claims. (Cl. 177—353)

The present invention relates, generally, to supervisory control systems, and, more particularly, to systems for selectively controlling and indicating the operation of a plurality of remotely disposed apparatus units.

Previously known supervisory control systems operating over a single communication channel have required a very considerable number of relays and a large amount of control apparatus at each apparatus unit to properly selectively operate and indicate the operation of each of several remotely disposed apparatus units.

The object of my invention is to provide a supervisory control system which shall function to selectively control, operate and supervise the operation of a plurality of remotely disposed apparatus units over a single communication channel, employing less apparatus for these functions than has been required heretofore, and which shall be inexpensive to manufacture, install, operate and maintain.

This and other objects and advantages of the invention will be apparent from the following detailed description taken in connection with the accompanying drawings, Figs. 1, 2, 3 and 4 of which, when joined together, as indicated, comprise a diagrammatic representation of a supervisory control system embodying the principal features of my invention.

The apparatus of Figs. 1, 2, 3 and 4 represents the control apparatus at a control station and at remotely disposed substations or units of apparatus, respectively. Similar reference characters of the several figures represent like elements. The control station and remote stations are connected by a conducting channel comprising conductors 6 and 8 over which control power is transmitted between the stations.

Figure 1:
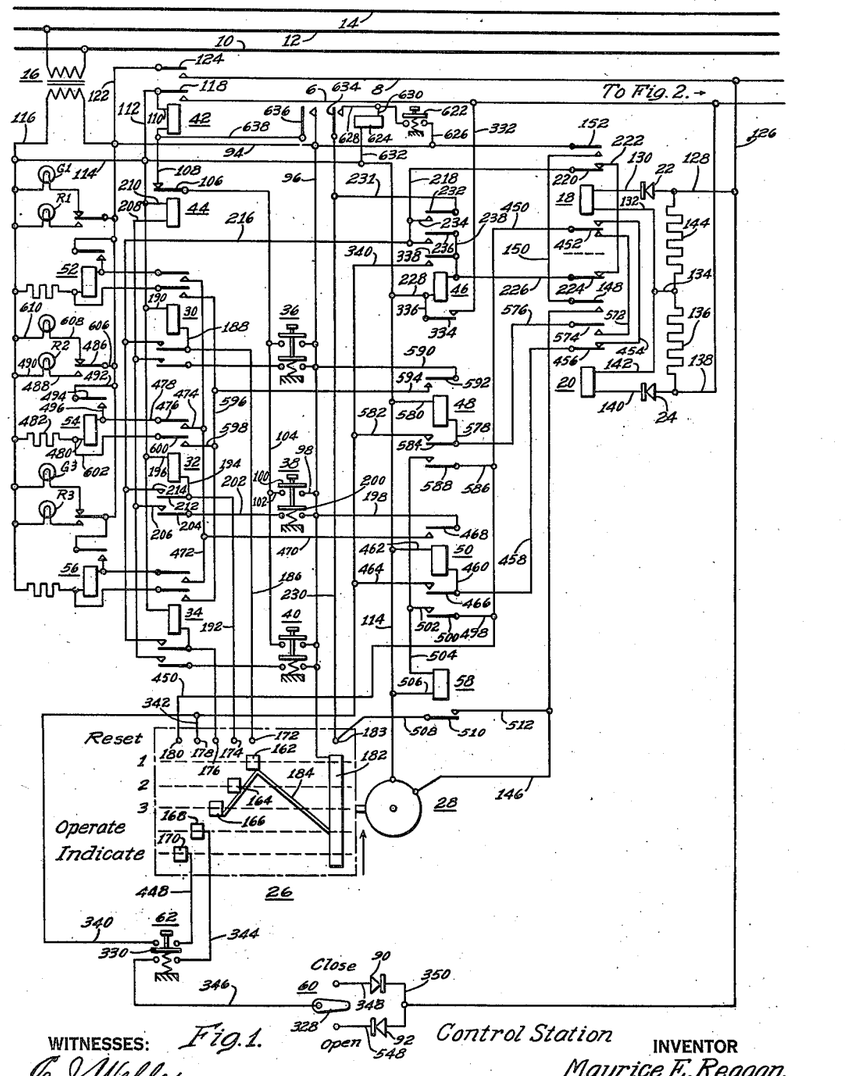

At the control station shown in Fig. 1, the energizing power for the control station apparatus is provided from a suitable source of alternating-current power represented by the conductors 10, 12 and 14 through a transformer 16. A pair of relays 18 and 20 are connected through electric valves 22 and 24 to the line conductors 6 and 8, so that both relay 18 and relay 20 will respond to alternating current applied to the conductors 6 and 8, and the separate relays 18 and 20 will respond to different polarities of potential applied to the conductors 6 and 8.

A drum contactor 26, driven by a motor 28, controls the actuation of point relays 30, 32 and 34 in conjunction with point selecting circuit control devices or switches 36, 38 and 40. A relay 42 functions to control the application of alternating-current power to the conductors 6 and 8 at the control station. The relay 42 is controlled by a relay 44 and any selected one of the switches 36, 38 and 40. A master relay 46 functions to retain actuation of the selected one of the point relays 30, 32 and 34. A pair of supervisory relays 48 and 50 functions to control the indicating relays 52, 54 and 56. A reset relay 58 functions to reset the apparatus to normal after a selective operation. Selection of the desired operation at the selected station, apparatus unit or point is made by the manual selector circuit control device or switch 60, and the selected operation is initiated by a master circuit control device or switch 62.

Figure 2:
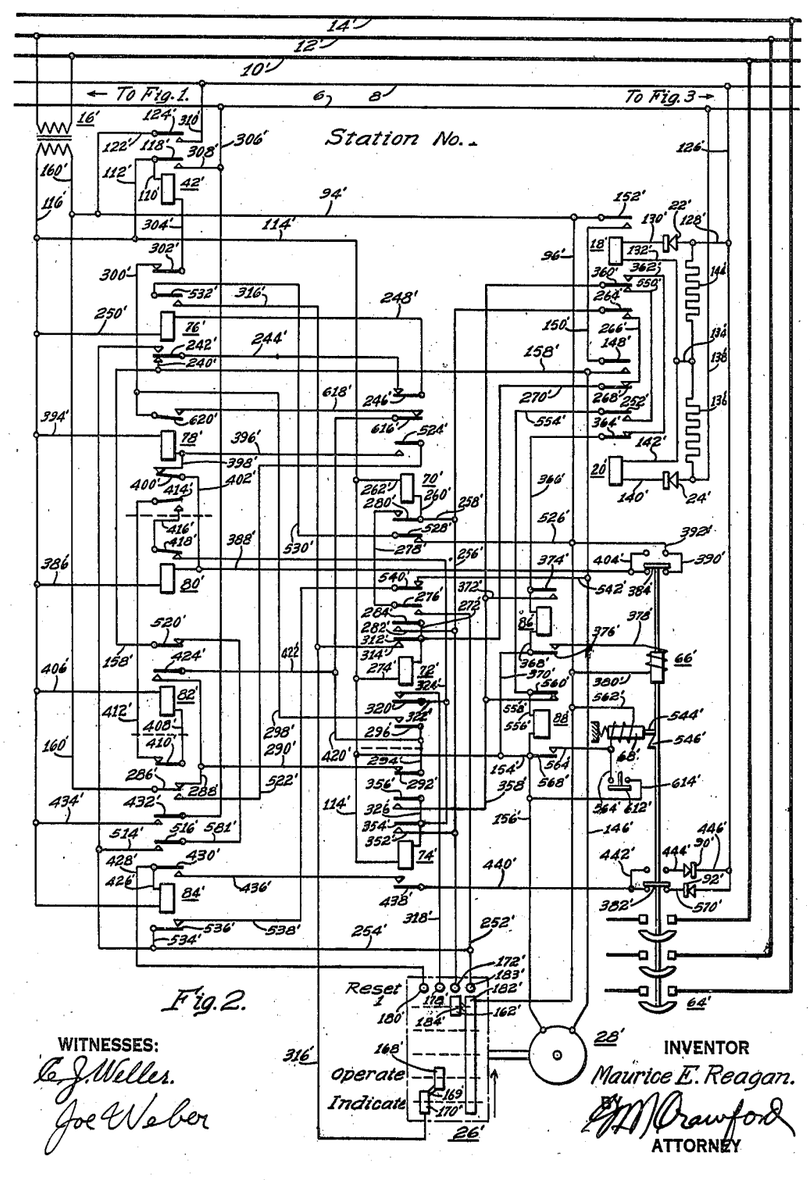

At the first station, shown in Fig. 2, a motor 28' drives a drum contactor 26' similar to the drum contactor 26 of Fig. 1. The drum contactor 26' has a contact element positioned similar to the first contact element of the drum contactor 26, and a pair of contact elements positioned similar to the last two contact elements of the drum contactor 26. The source of alternating-current power represented by the conductors 10', 12' and 14' of Fig. 2 may be the same as or a different source from the source represented by the conductors 10, 12 and 14 so long as the relations of the motors, their respective driven drum contactors and their sources of power are such as to cause substantially synchronous movement of the corresponding contactors on the drum contactors 26 and 26'. For the present purpose of describing the principles of the invention, the motors 28 and 28' may be considered as single-phase synchronous motors, and the sources 10, 12 and 14 and 10', 12' and 14' may be considered as the same source or different sources of the same frequency. Likewise, the motors 28'' and 28''' and the sources 10'', 12'' and 14'' and 10''', 12''' and 14''' may be such as to produce substantial synchronism of rotation of the drum contactors 26, 26', 26'' and 26'''.

At the first station shown in Fig. 2, there is a circuit breaker 64' which may be closed by a closing coil 66' and opened by a trip coil 68'. There are also relays 18' and 20', electric valves 22' and 24' and a relay 42', all of which function in a similar manner to the similarly numbered elements of Fig. 1. Additional relays 70', 72', 74', 76', 78', 80', 82', 84', 86' and 88' are provided at the No. 1 station to perform functions which will be fully set forth hereinafter.

Figure 3:
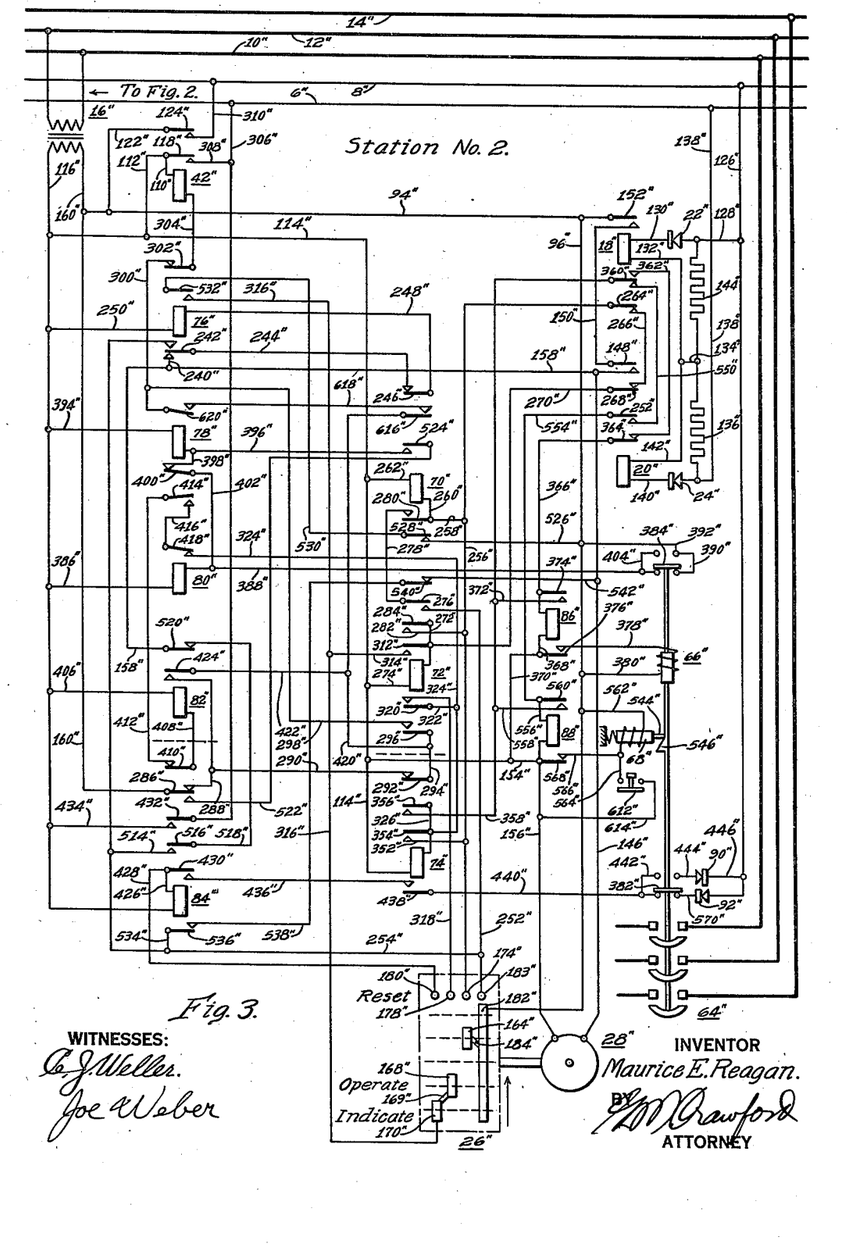
Figure 4:
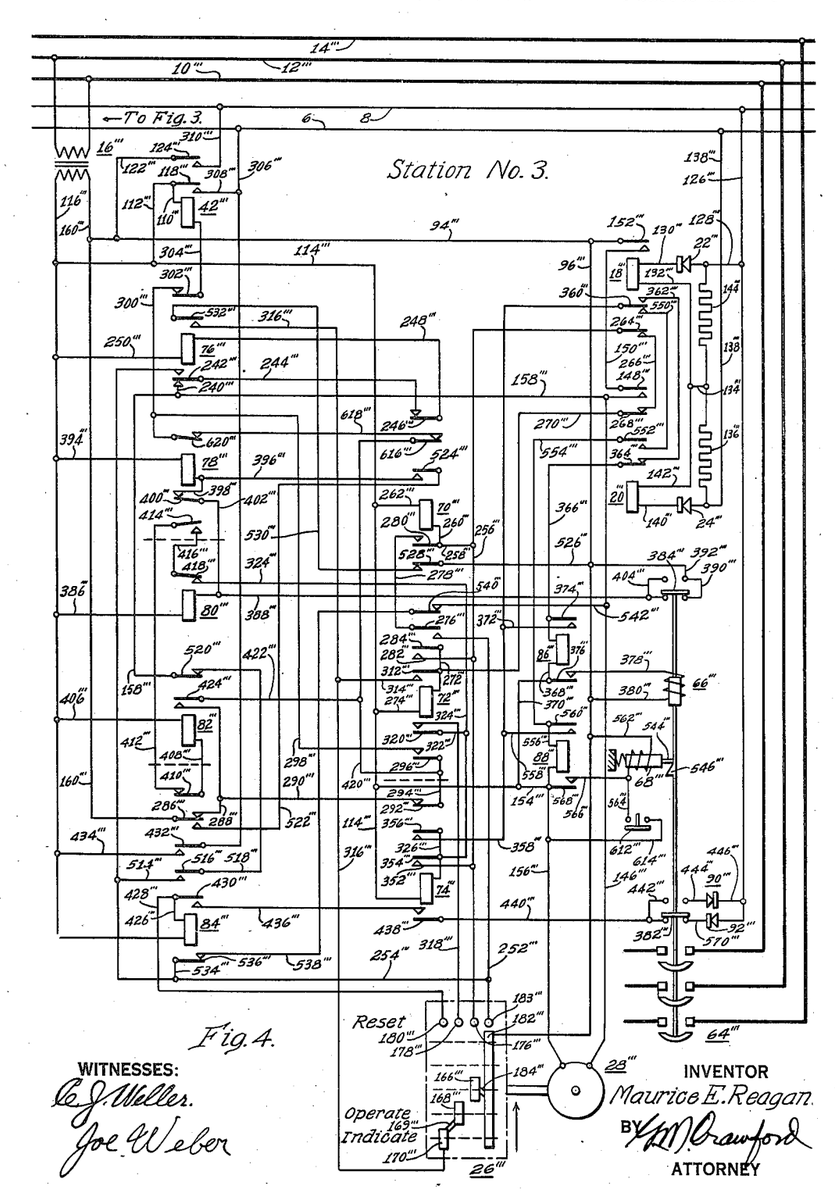

The apparatus elements at the stations Nos. 2 and 3 of Figs. 3 and 4 are substantial duplicates of the apparatus elements which bear similar reference numerals in Fig. 2, with the exception that the individual contact elements of the drum contactors 26″ and 26‴ are disposed to be closed simultaneously with the corresponding second and third contact elements on the drum contactor 26 of Fig. 1. The electric valve devices are also apparatus elements common to the control station of Fig. 1, and the remote stations of Figs. 2, 3 and 4, respectively, and it is understood that these electric valve devices and electric valve devices 22, 24, 22′, 24′, 22″, 24″, 22‴ and 24‴ function to conduct current sufficiently to operate the associated relays only in the single direction indicated by the representation of the electric valves.

The connections of the apparatus elements and the apparatus at the remote stations and the functioning thereof may be understood best by a description of the functioning of the system as a whole. With the apparatus in normal position and the circuit breakers in open circuit position, the apparatus of the system will be in the position shown in the drawings with relays 78′, 80′, 78″, 80″, 78‴ and 80‴ energized and the remaining relays deenergized. With the apparatus at the control station in this normal deenergized position, the indicating lamps G₁, G₂ and G₃ will be energized through the back contact elements of their controlling relays 52, 54 and 56 to indicate the open position of their associated circuit breakers 64′, 64″ and 64‴, respectively, and the indicating lamps R₁, R₂ and R₃ will be deenergized.

*Station selection*

When it is desired to close the circuit breaker 64″ at station No. 2, the operator at the control station will actuate the circuit control device 38 to complete an energizing circuit for the relay 42 which extends from one terminal of the secondary winding of the transformer 16 through conductors 94, 96 and 98, a contact element 100 of the circuit control device 38, conductors 102 and 104, a contact element 106 of the relay 44, a conductor 108, the winding of the relay 42, and conductors 110, 112, 114 and 116 to the other terminal of the secondary of the transformer 16. The actuation of the relay 42 will cause alternating-current potential to be applied to the communication conductors 6 and 8 in a circuit extending from the conductor 6 through the contact element 118 of the relay 42, the conductors 112, 114 and 116, the transformer 16, conductors 94 and 122, and a contact element 124 of the relay 42 to the conductor 8.

The application of alternating-current potential to the conductors 6 and 8 will cause the energization of the relay 18 in a circuit extending from the conductor 8 through conductors 126 and 128, the electric valve 22, a conductor 130, the winding of the relay 18, conductors 132 and 134, a resistor 136 and a conductor 138 to the conductor 6. The relay 20 is energized in a circuit extending from the conductor 6 through the conductor 138, the electric valve 24, a conductor 140, the winding of the relay 20, conductors 142 and 134, a resistor 144, and conductors 128 and 126 to the conductor 8. Similar energizing circuits are established for the relays 18′ and 20′, 18″ and 20″ and 18‴ and 20‴ at the stations Nos. 1, 2 and 3, respectively.

The simultaneous actuation of the relays 18 and 20 will close an energizing circuit for the drum contactor drive motor 28 extending from one terminal of the transformer 16 through the conductors 116 and 114, the motor 28, a conductor 146, a contact element 148 of the relay 20, a conductor 150, a contact element 152 of the relay 18, and the conductor 94 to the other terminal of the transformer 16. The relays 18′ and 20′ at the station No. 1, when actuated simultaneously, close an energizing circuit for the motor 28′ which extends from one terminal of the transformer 16′ through conductors 116′, 114′, 154′ and 156′, the motor 28′, the conductor 146′, a conductor 150′, the contact element 148′, the conductor 150′, the contact element 152′, and conductors 94′ and 160′ to the other terminal of the transformer 16′. Similar motor energizing circuits will be established by the relays 18″ and 20″, and 18‴ and 20‴ at the stations Nos. 2 and 3 and the drum contactors at all stations, including the control station, will be operated substantially synchronously.

As the drum contactor 26 is rotated, its contact elements 162, 164, 166, 168 and 170 will successively engage and pass by the associated contact elements 172, 174, 176, 178 and 180 respectively. When the contact elements 162 and 172 engage, they complete an energizing circuit for the point relay 30 which extends from one terminal of the transformer 16 through conductors 94 and 96, a contact element 182 of the drum contactor 26, a conductor 184, the contact elements 162 and 172, conductors 186 and 188, the winding of the relay 30 and conductors 190, 112, 114 and 116 to the other terminal of the transformer 16. The relay 30 will be energized only as long as the contact elements 162 and 172 are engaged, and none of the other elements of the apparatus will be affected by the actuation of the relay 30.

When continued movement of the drum contactor 26 causes the contact elements 164 and 174 to engage, the point relay 32 will be energized in a circuit extending from one terminal of the transformer 16 through the conductors 94 and 96, the contact element 182, the conductor 184, the contact elements 164 and 174, conductors 192 and 194, the winding of the relay 32, and conductors 196, 112, 114 and 116 to the other terminal of the transformer 16.

The actuation of the relay 32 will cause the relay 44 to be energized in a circuit extending from one terminal of the transformer 16 through the conductors 94 and 96, a conductor 198, a contact element 200 of the circuit control device 38, a conductor 202, a contact element 204 of the relay 32, conductors 206 and 208, the winding of the relay 44, and conductors 210, 112, 114 and 116 to the other terminal of the transformer 16. The actuation of the relay 44 will cause its contact element 106 to open the energizing circuit of the relay 42 which, when released, will remove the energizing alternating current from the communication conductors 6 and 8 to thereby release the relays 18 and 20 and the corresponding relays at the stations Nos. 1, 2 and 3 to thereby stop all of the motors 28, 28′, 28″ and 28‴ with the drum contactor 26 in position with the contact elements 164 and 174 engaged, and the drum contactors 26′, 26″ and 26‴ in corresponding positions with the contact elements 164″ and 174″ of the drum contactor 26″ in engagement.

When the relays 18 and 20 are released, they close an energizing circuit for the relay 46 extending from one terminal of the transformer 16 through the conductors 94 and 96, the contact element 182, the conductor 184, the contact elements 164 and 174, the conductor 192, a contact element 212 of the relay 32, conductors 214, 216 and 218, a contact element 220 of the relay 18, a conductor 222, a contact element 224 of the relay 20, a conductor 226, the winding of the relay 46, and conductors 228, 114 and 116, to the other terminal of the transformer 16.

The relay 46, when actuated, will close its own holding circuit extending from one terminal of the transformer 16 through the conductors 94 and 96, contact elements 182 and 183 which remain in engagement throughout the travel of the drum until it reaches the reset position, in which it is shown in the drawings, conductors 230 and 231, a contact element 232 of the relay 46, conductors 234, 218 and 216, a contact element 236 of the relay 46, conductors 238 and 226, the winding of the relay 46, and conductors 228, 114 and 116 to the other terminal of the transformer 16. The relay 46 also closes a holding circuit for the point relay 32 extending from one terminal of the transformer 16 through the conductors 94 and 96, the contact elements 182 and 184, the conductors 230 and 231, the contact element 232, the conductors 234, 218, 216 and 214, the contact element 212, the conductor 194, the winding of the relay 32, and the conductors 196, 112, 114 and 116 to the other terminal of the transformer 16.

At the station No. 1, when the relays 18' and 20' are energized as hereinbefore described, they will close an energizing circuit for the relay 76' which extends from one terminal of the transformer 16' through the conductors 160' and 94', the contact element 152', the conductor 150', the contact element 148', the conductor 158', a conductor 240', a contact element 242' of the relay 76', a conductor 244', a contact element 246' of the relay 70', a conductor 248', the winding of the relay 76', and conductors 250' and 116' to the other terminal of the transformer 16'. The actuation of the relay 76' will cause its contact element 242' to open its energizing circuit, but its contact element 242' in front contact position will close a holding circuit for the relay extending from one terminal of the transformer 16' through the conductors 94' and 96', the contact elements 182' and 183', conductors 252' and 254', the contact element 242', the conductor 244', the contact element 246', the conductor 248', the winding of the relay 76', and conductors 250' and 116' to the other terminal of the transformer 16'. However, both the energizing circuit and the holding circuit of the relay 76' will be broken during the momentary actuation of the relay 70' by the contact elements 162' and 172', as explained hereinafter, by the movement of the contact element 246' to open circuit position. As soon as the contact elements 162' and 172' disengage, the energizing circuit and then the holding circuit for the relay 76' will be reestablished.

At the station No. 1, when the hereinbefore described actuation of the drum contactor 25 causes the contact elements 162' and 172' to engage, the relay 70' will be energized in a circuit extending from one terminal of the transformer 16 through the conductors 94' and 96', the contact element 182', the conductor 184', the contact elements 162' and 172', conductors 256', 258' and 260', the winding of the relay 70' and conductors 262', 114', and 116' to the other terminal of the transformer 16. The drum contactor 26' will continue to rotate, and will disengage the contact elements 162' and 172' to deenergize the relay 70' and re-energize the relay 76' as explained hereinbefore.

As explained hereinbefore, all of the drum contactors 26, 26', 26'' and 26''' will move until their driving motors are deenergized by the release of their relays 18, 20, 18', 20', 18'', 20'', 18''' as a result of the deenergization of the relay 42 at the control station when the contact elements 164 and 177 engage. The drum contactor 26'' will stop with its contact elements 164'' and 174'' in engagement and the other drum contactors will stop in corresponding positions. With the contact elements 164'' and 174'' in engagement, the relay 70'' will be energized in a circuit extending from one terminal of the transformer 16'' through the conductors 160'', 94'', 96'', the contact element 182'', the conductor 184'', the contact elements 164'' and 174'', the conductors 256'', 258'' and 260'', the relay 70'' and the conductors 262'', 114'' and 116'' to the other terminal of the transformer 16''. The actuation of the relay 70'' will open the holding circuit of the relay 76'' which was energized and held energized by the back contact element 246'' of the relay 70'' and the contact elements 182'' and 183'' as explained hereinabove in connection with the operation of the corresponding elements at the station No. 1.

The engagement of the contact elements 164'' and 174'' and the release of the relays 18'' and 20'' will close an energizing circuit for the relay 72'' which extends from one terminal of the transformer 16'' through the conductors 160'', 94'' and 96'', the contact element 182'', the conductor 184'', the contact elements 164'' and 174'' on the drum contactor 26'', the conductor 256'', a contact element 264'' of the relay 18'', a conductor 266'', a contact element 268'' of the relay 20'', conductors 270'' and 272'', the winding of the relay 72'', and conductors 274'', 114'' and 116'' to the other terminal of the transformer 16''. The relay 72'' will close its own holding circuit extending from one terminal of the transformer 16'' through the conductors 160'', 94'' and 96'', the contact elements 182'' and 183'', the conductor 252', a contact element 276'' of the relay 72'', a conductor 278'', a contact element 280'' of the relay 70'', the conductors 258'', 256'' and 282'', a contact element 284'', the conductor 272'', the winding of the relay 72'', and the conductors 274'', 114'' and 116'' to the other terminal of the transformer 16''. The contact element 276'' of the relay 72'' and the contact element 280'' of the relay 70'' complete a holding circuit for the relay 70'' which extends from one terminal of the transformer 16'' through the conductors 160'', 94'' and 96'', the contact elements 182'' and 183'' on the drum contactor 26'', the conductor 252'', the contact element 276'', the conductor 278'', the contact element 280'', the conductor 260'', the winding of the relay 70'', and the conductors 262'', 114'' and 116'' to the other terminal of the transformer 16''.

The relay 72'' closes an energizing circuit for the relay 42'' which extends from one terminal of the transformer 16'' through the conductor 160'', a contact element 286'' of the relay 84'', conductors 288'' and 290'', a contact element 292'' of the relay 74'', a conductor 294'', a contact element 296'' of the relay 72'', conductors 298'' and 300'', a contact element 302'' of the relay 76'', a conductor 304'', the winding of the relay 42'', and the conductors 110'', 112'', 114'' and 116'' to the other terminal of the transformer 16''. The actuation of the relay 42'' will apply alternating current to the communication conductors 6 and 8 in a circuit which extends from the conductor 6 through the conductors 306'' and 308", the contact element 118", the conductors 112", 114" and 116", the secondary of the transformer 16", the conductors 160", 94" and 122", the contact element 124", and a conductor 310" to the conductor 8.

The application of alternating current potential to the communication conductors 6 and 8 will cause the relays 18, 20, 18', 20', 18", 20", 18'" and 20'" to be actuated to operate the drum contactor motors 28, 28', 28" and 28'" as hereinbefore described. As the drum contactor 26'" rotates its contact elements 166'" and 176'" will engage and cause operation of apparatus at the station No. 3 in the same manner as that described hereinbefore in connection with the operation of the apparatus at the station No. 1 when the contact elements 162' and 172' of the drum contactor engaged momentarily while the station No. 2 was being selected.

When the drum contactors have all moved to the position where their "operate" contact elements 168—178, 168'—178', 168"—178" and 168'"—178'", respectively engage, the "operate" contact elements 168" and 178" will close an energizing circuit for the relay 74" which extends from one terminal of the transformer 16" through the conductors 160", 94", 96", contact elements 182" and 183" of the drum contactor 26", the conductor 252", the contact element 276" of relay 72", the conductor 278", the contact element 280" of relay 70", the conductors 258", 256" and 282", the contact element 284" of relay 72", the conductor 272", a contact element 312" of relay 72", conductors 314" and 316", the contact element 170" of drum contactor 26", the conductor 169", the contact elements 168" and 178", a conductor 318", a contact element 320", conductors 322", 324", and 326", the winding of the relay 74", and conductors 114" and 116" to the other terminal of the transformer 16".

The actuation of the relay 74" will cause its contact element 292" to move to open circuit position to thereby deenergize the relay 42". The release of the relay 42" will remove the alternating current potential from the communication conductors 6 and 8 by opening the contact elements 118" and 124", to thereby release the relays 18 and 20, 18' and 20', 18" and 20" and 18'" and 20'", and, in turn, deenergize the motors 28, 28', 28" and 28'". With the drum contactors 26, 26', 26" and 26'" at rest with their contact elements 168 and 178, 168' and 178', 168" and 178", respectively, in engagement the apparatus at the station No. 2 will be prepared for the operation of the circuit breaker 64".

*Operation to close breaker*

The circuit breaker 64" may now be closed by moving the contact element 328 of the selector switch 60 to the upper position and actuating the master switch 62. When the contact element 330 of the master control switch 62 is in the lower contact position potential will be applied to the communication conductors 6 and 8 in a direction to operate the relays 18, 18', 18" and 18'" in a circuit extending from the conductor 6 through a conductor 332, a contact element 334 of the relay 46, conductors 336, 228, 114, and 116, the transformer 16, the conductors 94 and 96, the contact elements 182 and 183 of drum contactor 26, the conductors 230 and 231, the contact element 232 of relay 46, the conductors 234, 218 and 216, the contact element 236 of relay 46, the conductor 238, a contact element 338 of relay 46, conductors 340 and 342, the contact elements 178 and 168 of drum contactor 26, a conductor 344, the contact element 330 of master switch 62, a conductor 346, the contact element 328 of selector switch 60, a conductor 348, the rectifier or unidirectional electrical valve device 90, and conductors 350 and 126 to the conductor 8.

The operation of the relay 18" at the station No. 2 will close an energizing circuit for the closing relay 86" which extends from one terminal of the transformer 16" through the conductors 160", 94" and 96", the contact elements 182" and 183", the conductor 252", the contact element 276", the conductor 278", the contact element 280", the conductors 258", 256" and 352", a contact element 354" of the relay 74", the conductor 326", a contact element 356" of the relay 74", a conductor 358", a contact element 360" of the relay 18" in actuated position, a conductor 362", a contact element 364" of the relay 20", a conductor 366", the winding of the relay 86", and conductors 368", 370", 154", 114" and 116" to the other terminal of the transformer 16". The closing relay 86" will close its own holding circuit extending from one terminal of the transformer 16" through the conductors 160", 94" and 96", the contact elements 182" and 183", the conductor 252", the contact element 276", the conductor 278", the contact element 280", the conductors 258", 256" and 352", the contact element 354", the conductor 326", the contact element 356", the conductor 358", a conductor 372", a contact element 374" of the relay 86", the conductor 366", the relay 86", and conductors 368", 370", 154", 114" and 116" to the other terminal of the transformer 16". The operation of the closing relay 86" will energize the closing coil 66" of the circuit breaker 64" in a circuit extending from one terminal of the transformer 16" through the conductors 116", 114", 154", 370", a contact element 376" of the relay 86", a conductor 378", the closing coil 66", and conductors 380", 96", 94" and 160" to the other terminal of the transformer 16".

It is to be particularly noted that there can be no false operation or operation of the wrong circuit breaker since the sum of the movements of the drum contactors at the control station and the selected station must be the same to complete an operating circuit. The control station apparatus controls all of the drum contactor drive motors when the station is being selected, and the selected station apparatus controls all of the drum contactor drive motors when the apparatus is being actuated to the "operate" position. Thus if there is any false selection the sum of the "selection" movement and the "operation" movement of the drum contactors at the selected station and the control station will not be the same and the "operate" contact elements at the control station will not be made at the same time as the operate contact elements at the selected station, and either there will be no unidirectional "operate" potential placed on the system, or there will be no connection of the opening or closing relays at the selected station.

It is further to be noted that all stations are "locked out" of operation except the selected station by the failure of the 72 relay to pick up and close the circuit to the "operate" contact elements 168—178 at all stations except the selected station.

The energization of the closing coil 66" will cause it to close the circuit breaker 64" and to move the auxiliary contact elements 382" and 384" from the lower to the upper contact position. The movement of the contact element 384″ from the lower contact position will open the normal energizing circuit for the relay 80″ which extends from one terminal of the transformer 16″ through the conductors 116″ and 386″, the relay 80″, a conductor 388″, the contact element 384″, and conductors 390″, 392″, 96″, 94″, and 160″ to the other terminal of the transformer 16″. The movement of the contact element 384″ will also open the normal energizing circuit for the relay 78″ which extends from one terminal of the transformer 16″ through the conductors 116″, 394″, the relay 78″, conductors 396″ and 398″, a contact element 400″ of the relay 78″, conductors 402″ and 388″, the contact element 384″, and conductors 390″, 392″, 96″, 94″ and 160″ to the other terminal of the transformer 16″. The movement of the contact element 384″ to the upper contact position will again energize the relay 80″ in a circuit extending from one terminal of the transformer 16″ through the conductors 116″ and 386″, the relay 80″, the conductor 388″, a conductor 404″, the contact element 384″ and the conductors 392″, 96″, 94″, and 160″ to the other terminal of the transformer 16″.

With the relay 78″ released and the relay 80″ actuated, an energizing circuit will be established for the relay 82″ which extends from one terminal of the transformer 16″ through the conductors 116″ and 406″, the relay 82″, a conductor 408″, a contact element 410″ of the relay 84″, a conductor 412″, a contact element 414″ of the relay 78″, a conductor 416″, a contact element 418″ of the relay 80″, the conductor 324″, the contact element 354″, the conductors 352″, 256″ and 258″, the contact element 280″, the conductor 278″, the contact element 276″, the conductor 252″, the contact elements 183″ and 182″, and conductors 96″, 94″ and 160″ to the other terminal of the transformer 16″. The relay 82″ will close an energizing circuit for the relay 42″ extending from one terminal of the transformer 16″ through the conductors 116″, 114″, 112″ and 110″, the relay 42″, the conductor 304″, the contact element 302″, the conductors 300″ and 298″, the contact element 296″, the conductors 294″, 420″ and 422″, a contact element 424″ of the relay 82″, the conductor 288″, the contact element 286″, and the conductor 160″ to the other terminal of the transformer 16″.

The actuation of the relay 42″ will connect the communication conductors 6 and 8 to be energized by alternating current from the transformer 16″, as described hereinbefore, which will cause the actuation of the relays 18, 20, 18′, 20′, 18″, 20″, 18‴ and 20‴ to thereby energize and operate the motors 28, 28′, 28″ and 28‴ to drive the drum contactors 26, 26′, 26″ and 26‴, as described hereinbefore.

When the drum contactors 26, 26′, 26″ and 26‴ have been moved to the position where the contact elements 170, 170′, 170″, and 170‴ engage the contact elements 180, 180′, 180″ or 180‴, respectively, the contact elements 170″ and 180″ will complete an energizing circuit for the relay 84″ extending from one terminal of the transformer 16″ through the conductor 116″, the relay 84″, conductors 426″ and 428″, the contact elements 180″ and 170″, the conductors 316″ and 314″, the contact elements 312″, the conductor 272″, the contact element 284″, the conductors 282″, 256″ and 258″, the contact element 280″, the conductor 278″, the contact element 276″, the conductor 252″, the contact elements 183″ and 182″, and conductors 96″, 94″ and 160″ to the other terminal of the transformer 16″.

The actuation of the relay 84″ will open the hereinbefore referred to energizing circuit for the relay 42″ by moving the contact element 286″ from upper to lower contact position. The release of the relay 42″ will remove alternating-current potential from the communication conductors 6 and 8 to thus release the relays 18, 20, 18′, 20′, 18″, 20″, 18‴ and 20‴. The contact elements 430″ and 432″ of the relay 84″ close a circuit for applying a direct current potential to the communication conductors 6 and 8 of such polarity as to operate the relays 18, 18′, 18″ and 18‴, this polarity being determined by the rectifier unit or electrical valve 90″. This circuit extends from the conductor 6 through the conductor 306″, the contact element 432″, conductors 434″ and 116″, the transformer 16″, the conductors 160″, 94″, and 96″, the contact elements 182″ and 183″, the conductor 252″, the contact element 276″, the conductor 278″, the contact element 280″, the conductors 258″, 256″ and 282″, the contact element 284″, the conductor 272″, the contact element 312″, the conductors 314″ and 316″, the contact elements 170″ and 180″, the conductor 428″, the contact element 430″, a conductor 436″, a contact element 438″ of the relay 74″, conductors 440″ and 442″, contact element 382″, a conductor 444″, the rectifier 90″, and conductors 446″ and 126″ to the conductor 8.

The operation of the relay 18 at the control station will complete an energizing circuit for the relay 50 which extends from one terminal of the transformer 16 through the conductors 94 and 96, the contact elements 182 and 183, the conductors 230 and 231, the contact element 232, the conductors 234, 218 and 216, the contact element 236, the conductor 238, the contact element 338, the conductor 340, the contact element 330, a conductor 448, the contact elements 170 and 180, a conductor 450, a contact element 452 of the relay 18, a conductor 454, a contact element 456 of the relay 20, conductors 458 and 460, the winding of the relay 50, and conductors 462, 114 and 116 to the other terminal of the transformer 16.

The operation of the relay 50 will cause it to close its own holding circuit extending from one terminal of the transformer 16 through the conductors 94 and 96, the contact elements 182 and 183, the conductors 230 and 231, the contact element 232, the conductors 234, 218 and 216, the contact element 236, the conductor 238, the contact element 338, the conductors 340 and 464, a contact element 466 of the relay 50, and conductors 462, 114 and 116 to the other terminal of the transformer 16. The relay 50 also closes an energizing circuit for the relay 54 which extends from one terminal of the transformer 16 through the conductors 94, 96 and 198, a contact element 468 of the relay 50, conductors 470, 472 and 474, a contact element 476 of the relay 32, a conductor 478, the winding of the relay 54, a conductor 480, a current limiting resistor 482, and the conductor 116 to the other terminal of the transformer 16. The relay 54 will close an energizing circuit for an indicating lamp $R_2$ extending from one terminal of the transformer 16 through the conductors 94 and 122, a contact element 486 of the relay 54, a conductor 488, the lamp $R_2$, and conductors 490 and 116 to the other terminal of the transformer 16. The relay 54 will also close its own holding circuit which extends from one terminal of the transformer 16 through the conductors 94, 122 and 492, a contact element 494 of the relay 54, conductors 496 and 478, the relay 54, the conductor 480, the resistor 482, and the conductor 116 to the other terminal of the transformer 16. Thus an indication of the closure of the circuit breaker 64" at the No. 2 station will be given and maintained by the indicating lamp R₂ at the control station.

The operation of the relay 50 will also close an energizing circuit for the relay 58 which extends from one terminal of the transformer 16 through the conductors 94 and 96, the contact elements 182 and 183, the conductors 230 and 231, the contact element 232, the conductors 234, 218 and 216, the contact element 236, the conductor 238, the contact element 338, the conductor 340, the contact element 330, the conductor 448, the contact elements 170 and 180, conductors 450 and 498, a contact element 500 of the relay 50, conductors 502 and 504, the relay 58 and conductors 506, 114 and 116 to the other terminal of the transformer 16. The actuation of the relay 58 will close an energizing circuit for the drum contactor motor 28 extending from one terminal of the transformer 16 through the conductors 94 and 96, the contact elements 182 and 183, a conductor 508, a contact element 510 of the relay 58, conductors 512 and 146, the motor 28, and the conductors 114 and 116 to the other terminal of the transformer 16. The motor 28 will then operate the drum contactor 26 to reset position where the contact elements 182 and 183 will disengage and the contact elements 179 and 180 will disengage.

The disengagement of the contact elements 182 and 183 will cause the drum contactor 26 to stop in the normal reset position shown in the drawings by opening the energizing circuit of its drive motor 28. The disengagement of the contact elements 182 and 183 will also open the energizing circuits of the relays 32, 46, 50 and 58 and these relays will be released to return to the normal positions shown in Fig. 1 of the drawings.

At the station No. 2 shown in Fig. 3, when the relay 84" was actuated as described hereinbefore, the relay 82" was deenergized to complete an energizing circuit for the drums contactor motor 28" extending from one terminal of the transformer 16" through the conductors 160", 94" and 96", the contact elements 182" and 183", the conductors 252", 254" and 514", a control element 516" of the relay 84", a conductor 518", a contact element 520" of the relay 82", the conductors 158" and 146", the motor 28", and the conductors 156", 154", 114" and 116" to the other terminal of the transformer 16".

The drum contactors 26" will be actuated by its drive motor 28" until the drum contact elements 182" and 183" become disengaged at which point the drum contactor 26" will be stopped by the deenergization of its drive motor 28", with the drum contactor in the reset position shown in the drawings. The disengagement of the contact elements 182" and 183" will cause the deenergization of the relays 70", 72", 74", 86" and 84". Previous to the release of the relay 84" its contact element 286" will close an energizing circuit for the relay 78" extending from one terminal of the transformer 16" through the conductor 160", the contact element 286", a conductor 522", a contact element 524" of the relay 70", the conductor 396", the relay 78" and the conductors 394" and 116" to the other terminal of the transformer 16". The relay 78" will then close its own holding circuit which was described hereinbefore. The release of the relay 84" will cause the relays 18, 18', 18" and 18''' to be deenergized and the apparatus at the control station and the apparatus at the station No. 2 will be returned to the normal positions shown in the drawings.

At the station No. 1 shown in Fig. 2, when the drum contactor has been advanced to the point where the contact elements 170' and 180' are engaged following the closure of the circuit breaker 64" at the station No. 2 as described hereinbefore, the relay 84' will be energized in a circuit extending from one terminal of the transformer 16' through the conductors 160', 94', 96' and 526', a contact element 528' of the relay 70', a conductor 530', a contact element 532' of the relay 76', the conductor 316', the contact elements 170' and 180', the conductor 426', and 426', the relay 84', and the conductor 116' to the other terminal of the transformer 16'.

The actuation of the relay 84' will close an energizing circuit from the drum contactor drive motor 28' extending from one terminal of the transformer 16' through the conductors 160', 94' and 96', the contact elements 182' and 183', conductors 252', 254' and 534', a contact element 536' of the relay 84', a conductor 538', a contact element 540' of the relay 72', conductors 542' and 146', the motor 28', and conductors 156', 154', 114' and 116' to the other terminal of the transformer 16'. The drum contactor drive motor 28' will operate until the drum contactor 26' reaches reset position where it will be stopped by the disengagement of the contact elements 182' and 183'. The relay 84' will also be deenergized by the disengagement of the contact elements 182' and 183' and the elements of apparatus at the station No. 1 will be returned to the normal positions shown in the drawings. The apparatus at the station No. 3 will be automatically reset in the same manner as that at the station No. 1 as described hereinabove.

*Operation to open breaker*

After the circuit breaker 64" at the station No. 2 has been operated and the apparatus at all stations has been returned to normal position, the circuit breaker 64" is held in closed position by a releasable latch device such as the electrically operable trip device 68" which may comprise a movable stop member 544" cooperating with a detent 546" actuated by the circuit breaker 64", whereby the circuit breaker may be tripped open by the energization of the trip device 68". When it is desired to trip the circuit breaker 64" from the control station, the circuit control device 38 may be operated at the control station and the system will function, as described hereinbefore, to select the No. 2 station and to actuate the drum contactors 26, 26', 26" and 26''' to the "operate" position with their contact elements 168—178, 168'—178', 168"—178" and 168'''—178''' in engagement.

With the station No. 2 selected, the relays 70", 72" and 74" will be held actuated at the station No. 2. The circuit control device 328 will now be moved to the lower contact position and the circuit control device 62 will be actuated to energize the communication conductors 6 and 8 with a potential of such polarity as to operate the relays 20, 20', 20" and 20''' only. This polarity will be controlled by the electric valve or rectifier 92. The energizing circuit for the conductors 6 and 8 extends from the conductor 8 through the conductors 126 and 350, the rectifier 92, a conductor 548, the circuit control device 323, the conductor 346, the contact element 330 in the lower contact position, the conductor 344, the contact elements 168 and 178, the conductors 342 and 340, the contact element 338, the conductor 238, the contact element 236, the conductors 216, 218 and 234, the contact element 232, the conductors 231 and 230, the contact elements 183 and 182, the conductors 96 and 94, the transformer 16, the conductors 116, 114, 228, and 336, the contact element 334, and the conductor 332 to the conductor 6.

The actuation of the relay 20'' will close an energizing circuit for the relay 88'' extending from one terminal of the transformer 16'' through the conductors 160'', 94'' and 96'', the contact elements 182'' and 183'', the conductor 252'', the contact element 276'', the conductor 278'', the contact element 280'', the conductors 258'', 256'' and 352'', the contact element 354'', the conductor 326'', the contact element 356'', the conductor 358'', the contact element 360'', a conductor 550'', a contact element 552'' of the relay 20'', conductors 554'' and 556'', the relay 88'', and the conductors 156'', 154'', 114'' and 116'' to the other terminal of the transformer 16''. The relay 20'' will close its own holding circuit extending from one terminal of the transformer 16'' through the conductors 160'', 94'' and 96'', the contact elements 182'' and 183'', the conductor 252'', the contact element 276'', the conductor 278'', the contact element 280'', the conductors 258'', 256'' and 352'', the contact element 354'', the conductor 326'', the contact element 356'', conductors 358'' and 558'', a contact element 560'' of the relay 80'', the conductor 556'', the relay 88'', and the conductors 156'', 154'', 114'' and 116'' to the other terminal of the transformer 16''.

The actuation of the relay 88'' will close an energizing circuit for the trip device 68'' extending from one terminal of the transformer 16'' through the conductors 160'', 94'', 96'' and 562'', the winding of the trip device 68'', conductors 564'' and 566'', a contact element 568'' of the relay 88'', and the conductors 154'', 114'' and 116'' to the other terminal of the transformer 16''. The actuation of the trip device 68'' will cause the circuit breaker 64'' to move to open circuit position and to move the contact elements 382'' and 384'' from the upper contact position to the lower contact position.

When the contact element 384'' moves from the upper contact position to the lower contact position, it will release the relays 78'' and 80'' and then reenergize the relay 80'', and this action will cause the drum contactor drive motors 28, 28', 28'' and 28''' to move their respective drum contactors 26, 26', 26'' and 26''' to the "indicate" position with their contact elements 170—180, 170'—180', 170''—180'' and 170'''—180''', respectively, in engagement as explained hereinbefore in connection with the functioning of the system when the contact element 384'' moved from the lower to the upper contact position upon closure of the circuit breaker 64''.

The engagement of the contact elements 170'' and 180'' will close the energizing circuit for the relay 84'', as explained hereinbefore, and the actuation of the relay 84'' will cause potential to be applied to the communication conductors 6 and 8 of such polarity as to actuate the relays 20, 20', 20'' and 20''' only. This energizing circuit for the conductors 6 and 8 extends from the conductor 8 through the conductor 126'', the rectifier 92'', a conductor 570'', the contact element 382'', the conductor 440'', the contact element 438'', the conductor 436'', the contact element 430'', the conductor 428'', the contact elements 180'' and 170'', the conductors 316'' and 314'', the contact element 312'', the conductor 272'', the contact element 284'', the conductors 282'', 256'' and 258'', the contact element 280'', the conductor 278'', the contact element 276'', the conductor 252'', the contact elements 183'' and 182'', the conductors 96'', 94'' and 160'', the transformer 16'', the conductors 116'' and 434'', the contact element 432'' and the conductor 306'' to the conductor 6.

The actuation of the relay 20 at the control station by the potential applied to the conductors 6 and 8, as described hereinabove, will close an energizing circuit for relay 48 which extends from one terminal of the transformer 16 through the conductors 94 and 96, the contact elements 182 and 183, the conductors 230 and 231, the contact element 232, the conductors 234, 218 and 216, the contact element 236, the conductor 238, the contact element 338, the conductor 340, the contact element 330, the conductor 448, the contact elements 170 and 180, the conductor 450, the contact element 452, a conductor 572, a contact element 574 of the relay 20, conductors 576 and 578, the relay 48, and conductors 580, 114 and 116 to the other terminal of the transformer 16. The relay 48 will close its own holding circuit which extends from one terminal of the transformer 16 through the conductors 94 and 96, the contact elements 182 and 183, the conductors 234, 218 and 216, the contact element 236, the conductor 238, the contact element 338, the conductors 340 and 582, a contact element 584 of the relay 48, the conductor 578, the relay 48 and the conductors 580, 114 and 116 to the other terminal of the transformer 16.

The actuation of the relay 48 will close an energizing circuit for the relay 58 which extends from one terminal of the transformer 16 through the conductors 94 and 96, the contact elements 182 and 183, the conductors 230 and 231, the contact element 232, the conductors 234, 218 and 216, the contact element 236, the conductor 238, the contact element 338, the conductor 340, the contact element 330, the conductor 448, the contact elements 170 and 180, conductors 450 and 586, a contact element 588 of the relay 48, the conductor 504, the relay 58, and the conductors 506, 114 and 116 to the other terminal of the transformer 16. The actuation of the relay 58 will cause the motor 28 to drive the drum contactor 26 to reset position, as described hereinbefore in connection with the resetting of the apparatus at the control station after the closing of the circuit breaker 64''.

The relay 48 will also close a circuit extending from the conductor 94 through the conductors 96 and 590, a contact element 592 of the relay 48, conductors 594, 596 and 598, a contact element 600 of the relay 32 and a conductor 602 to the conductor 480 which acts as a shunting circuit for the part of the holding circuit for the relay 54 extending from the conductor 94, through the conductors 122 and 492, the contact element 494, the conductors 496 and 478, and the relay 54 to the conductor 480 to thus release the relay 54. The resistor 482 functions to limit the flow of current in this shunting circuit. The release of the relay 54 will cause its contact element 486 to open the energizing circuit for the "closed" indication lamp 484 and to close an energizing circuit for an "open" indication lamp G2 which extends from one terminal of the transformer 16 through the conductors 94, 122 and 606, the contact element 486, a conductor 608, the lamp G2, and conductors 610 and 116 to the other terminal of the transformer 16.

The actuation of the relay 84" referred to hereinabove functions to reset the apparatus at the station No. 2 in the manner described hereinabove in connection with the resetting of the apparatus after the closure of the circuit breaker 64".

The apparatus at the stations Nos. 1 and 3 will be reset automatically in response to the engagement of the contact elements 170' and 180' and 170''' and 180''', respectively, as explained hereinbefore in connection with the resetting of the apparatus at these stations after the closure of the circuit breaker 64".

Automatic operation

Provision has been made for automatically tripping and supervising the operation of any closed circuit breaker in the event of a fault on the circuit which is controlled by the breaker, upon the occurrence of any other condition which would make it desirable that the breaker be automatically tripped, or manually from the station at which the breaker is located if desired. Taking the circuit breaker 64" as an example and assuming that the circuit breaker 64" is closed, a contact element 612", which may be automatically moved to closed circuit position by any well-known means upon the occurrence of any condition which would make it desirable that the breaker be tripped, or by manual means when it is desired to trip the breaker from the station at which the breaker is located, is disposed to close an energizing circuit for the trip device 68" extending from one terminal of the transformer 16" through the conductors 160", 94", 96" and 562", the trip device 68", the conductor 564", the contact element 612", and conductors 614", 156", 154", 114" and 116" to the other terminal of the transformer 16".

When the circuit breaker 64" is opened by the operation of the trip device 68", the contact element 384" will move from upper to lower contact position, and in so doing will cause the release of the relays 78" and 80" and the reenergization of the relay 80" as described hereinabove. The relay 78" will close an energizing circuit for the relay 42" which extends from one terminal of the transformer 16" through the conductor 160", the contact element 286", the conductor 288", the contact element 424", the conductors 422" and 428", a contact element 616" of the relay 70", a conductor 618", a contact element 620" of the relay 78", the conductor 300", the contact element 302", the conductor 304", the relay 42", and the contact elements 110", 112", 114" and 116" to the other terminal of the transformer 16".

The operation of the relay 42" will cause alternating current to be applied to the communication conductors 6 and 8 from the secondary winding of the transformer 16" to thereby operate the relays 18, 20, 18', 20', 18", 20", 18''' and 20''' which, in turn, will cause the drum contactor motors 28, 28', 28" and 28''' to operate as explained hereinbefore. When the drum contactors 26, 26', 26" and 26''' reach the No. 2 station contact position with the contact elements 164" and 174" in engagement, the relay 70" will be energized in its previously described energizing circuit, and its contact element 616" will open the energizing circuit of the relay 42". The release of the relay 42" will cause the alternating-current potential to be removed from the conductors 6 and 8 to thereby deenergize the motors 28, 28', 28" and 28''' and their associated drum contactors 26, 26', 26" and 26''' in the No. 2 station contact position.

The release of the relays 18" and 20" will complete an energizing circuit for the relay 72" through the contact elements 264" and 268" of the relays 18" and 20", the relay 70" will be held energized through the contact elements 280" of the relay 70" and the contact elements 183" and 182" of the drum contactor 26", and the relay 72" will be held energized through its contact elements 284" and 276", the contact element 280" of the relay 70" and the contact elements 183" and 182" of the drum contactor 26" as explained hereinbefore. The relay 72" will close an energizing circuit for the relay 42" which includes the contact element 286" of the relay 84", the contact element 292" of the relay 74", the contact element 296" of the relay 72", and the contact element 32" of the relay 76", and the relay 42" will again apply alternating-current potential to the communication conductors 6 and 8 to energize the relays 18, 20, 18', 20', 18", 20", 18''' and 20''' to, in turn, operate the motors 28, 28', 28" and 28''' as explained hereinbefore.

At the control station, at the release of the relays 18 and 20 when the drum contactor contact elements 164" and 174" engage at the station No. 2, the relay 32 is energized through the drum contact elements 164 and 174, and the relay 46 is energized through the contact element 224 of the relay 20, the contact element 220 of the relay 18, the contact element 212 of the relay 32, and the contact elements 174 and 164 of the drum contactor. The relay 46 is held energized through its contact elements 236 and 232 and the contact elements 183 and 182 of the drum contactor 26.

When the drum contactors 26, 26', 26" and 26''' have moved to the "operate" position with the contact elements 168" and 178" in engagement, the relay 74" will be energized in the previously described circuit including the contact element 320" of the relay 72", the contact elements 178" and 168" of the drum contactor 26", the contact elements 312" and 284" of the relay 72", the contact element 280" of the relay 70", the contact element 276" of the relay 72", and the contact elements 183" and 182" of the drum contactor 26". The relay 74" will close its own holding circuit through its contact element 354".

The operation of the relay 74" will cause its contact element 292" to move to open circuit position and this would open the energizing circuit of the relay 42" to thereby deenergize the relays 18, 20, 18', 20', 18", 20", 18''' and 20''' to stop the motors 28, 28', 28" and 28''' but for the closure of the contact element 424" of the relay 82", which is connected in shunting relation with the contact element 292" of the relay 74", when the relay 82" is energized in a circuit including the contact element 41" of the relay 84", the contact element 414" of the relay 78", the contact element 418" of the relay 80", the contact element 320" of the relay 72", the contact elements 178" and 168" of the drum contactor 26", the contact elements 312" and 284" of the relay 72", the contact element 280" of the relay 70″, the contact element 276″ of the relay 72″ and the contact elements 183″ and 182″ of the drum contactor 26″. The motors 28, 28′, 28″ and 28‴ will actuate their associated drum contactors to the "indicate" position, from which position the apparatus at each of the stations Nos. 1 and 3 will reset itself as explained hereinbefore.

When the contact elements 170″ and 180″ engage at the station No. 2, the apparatus at the station No. 2 will reset itself, and cause the apparatus at the control station to deenergize the "closed" indication lamp R2, energize the "open" indication lamp G2, and reset itself as explained hereinabove in connection with the operation of the system after the circuit is opened from the control station.

*Manual reset*

In the event that it is desired to reset the system after an apparatus unit has been selected for operation, without operating the selected apparatus unit, a reset circuit control device 622 may be actuated at the control station. The circuit control device 622 will close an energizing circuit for a relay 624 extending from one terminal of the transformer 16 through conductors 94 and 626, the contact element 622, conductors 628, and 630, the relay 624, and conductors 632, 114 and 116 to the other terminal of the transformer 16. The relay 624 will close its own holding circuit extending from one terminal of the transformer 16 through the conductors 94 and 96, the contact elements 182 and 183 of the drum contactor 26, the conductor 230, a contact element 634 of the relay 624, the conductors 628 and 630, the relay 624, and the conductors 632, 114 and 116 to the other terminal of the transformer 16. The relay 624 will also close an energizing circuit for the relay 42 extending from one terminal of the transformer 16 through the conductors 94 and 96, a contact element 636 of the relay 624, conductors 638 and 108, the relay 42, and the conductors 110, 112, 114 and 116 to the other terminal of the transformer 16.

The actuation of the relay 42 will cause alternating current potential to be applied to the communication conductors 6 and 8, thereby actuating the relays 18, 20, 18′, 20′, 18″, 20″, 18‴ and 20‴ to, in turn, energize the drum contactor drive motors 28, 28′, 28″ and 28‴ as explained hereinbefore. When the drum contactors have been actuated to the reset position, the relays 624, 42, 18, 18′, 18″, 18‴, 20, 20′, 20″ and 20‴ will be released by the disengagement of the contact elements 182 and 183 of the drum contactor 26, and the apparatus at all of the stations will be stopped in the reset position ready for the next selective or automatic operation of any of the circuit breakers 64′, 64″ and 64‴.

It is to be understood that the circuit breakers 64′, 64″ and 64‴ are merely illustrative of apparatus units that may be selected and operated from the control station, and that the system may be employed to select any desired apparatus that can be made to respond to the selective actuation of the relays 86′, 88′, 86″, 88″, 86‴ and 88‴. It is further to be understood that the three selectable stations Nos. 1, 2 and 3 are shown, and their operation described herein, merely to illustrate the functioning of the system at stations other than a selected station when a station is passed in the selection of another station, and when a station is passed when the system is being reset after the selection of another station. As many stations as desired may be selected and operated by means of the present system, it being necessary only that the drum contactor 26 at the control station be provided with a number of pairs of spaced contact elements such as 164—174, 166—176, and 168—178, equal to the selective stations, and that other apparatus which is individual to the separate stations Nos. 1, 2 and 3 be provided for each of the selective stations.

While the invention has been shown and described with motor-driven drum contactors for selecting the various selecting, operating and indicating circuits and apparatus, it is to be understood that other forms of selecting apparatus as are commonly used in the supervisory control art, such, for example, as relay counting chains, may be substituted for the drum-contactor type of selecting means without departing from the principles of operation of the present invention.

Thus, it will be seen that I have provided a supervisory control system which shall function to selectively control, operate and supervise the operation of a plurality of remotely disposed apparatus units over a single communication channel employing less apparatus for these functions than has been required heretofore, and which shall be inexpensive to manufacture, install, operate and maintain.

In compliance with the patent statutes, I have shown and described herein a preferred embodiment of my invention. It is to be understood, however, that the invention is not limited to the precise construction shown and described, but is capable of modification by one skilled in the art, the embodiment herein disclosed being merely illustrative of the principles of my invention.

I claim as my invention:

1. In a supervisory control system, a conducting channel extending between a control station and a plurality of apparatus units, operating means for each of the apparatus units, a group of circuit control devices at the control station, a group of circuit control devices associated with each apparatus unit, one of the circuit control devices associated with each apparatus unit corresponding to one of the circuit control devices at the control station, other of the circuit control devices associated with each of the apparatus units corresponding each to a separate one of other of the circuit control devices at the control station, actuating means associated with each group of circuit control devices for actuating when energized simultaneously over said conducting channel the circuit control devices at the control station momentarily in sequence and actuating the circuit control devices associated with the apparatus units simultaneously with their corresponding circuit control devices at the control station, relay means individual to each actuating means responsive to the energization of the conducting channel with alternating current for connecting the actuating means thereto for effecting simultaneous energization thereof, selecting means at the control station corresponding to the separate apparatus units, means at the control station responsive to the actuation of a selected one of said selecting means for energizing the conducting channel with alternating current to operate all of said actuating means simultaneously, means responsive to the actuation by said actuating means of the circuit control device at the control station corresponding to the actuated one of the selecting means for stopping all of said actuating means by deenergizing the communication channel, means responsive to the actuation of the circuit control device at the apparatus unit corresponding to the actuated one of the selecting means and the deenergization of the conducting channel for again energizing the conducting channel with alternating current for again operating all of said actuating means simultaneously, and means responsive to the actuation by said actuating means of the said one circuit control device for connecting the operating means of the apparatus unit corresponding to the actuated one of the selecting means for operation over said conducting channel from the control station.

2. In a supervisory control system, a conducting channel extending between a control station and a plurality of apparatus units, operating means for each of the apparatus units, a group of circuit control devices at the control station, a group of circuit control devices associated with each apparatus unit, one of the circuit control devices associated with each apparatus unit corresponding to one of the circuit control devices at the control station, other of the circuit control devices associated with each of the apparatus units corresponding each to a separate one of other of the circuit control devices at the control station, actuating means associated with each group of circuit control devices for actuating when energized simultaneously over said conducting channel the circuit control devices at the control station momentarily in sequence and actuating the circuit control devices associated with the apparatus units simultaneously with their corresponding circuit control devices at the control station, means at the control station and means associated with each apparatus unit responsive to the energization of the conducting channel with alternating current for connecting all of said actuating means thereto for effecting simultaneous energization thereof, selecting means at the control station corresponding to the separate apparatus units, means at the control station responsive to the actuation of a selected one of said selecting means thereat for energizing the conducting channel with alternating current to operate all of said actuating means simultaneously, means responsive to the actuation by said actuating means of the circuit control device at the control station corresponding to the actuated one of the selecting means for deenergizing the conducting channel thereby stopping all of said actuating means, means responsive to the actuation of the circuit control device at the apparatus unit corresponding to the actuated one of the selecting means and the deenergization of the conducting channel for again reenergizing the conducting channel for again operating all of said actuating means simultaneously, means responsive to the actuation by said actuating means of the said one circuit control device for connecting the operating means of the apparatus unit corresponding to the actuated one of the selecting means for operation over said conducting channel from the control station, means for actuating the connected operating means of the said selected apparatus unit over said conducting channel from the control station, and means responsive to the actuation of said selected apparatus unit for again reenergizing the conducting channel for causing the several actuating means to reset their associated groups of circuit control devices for a subsequent selecting sequence of operation.

3. In a supervisory control system, a communication channel extending between a control station and a plurality of apparatus units, indicating means at the control station individual to each apparatus unit, operating means for each of the apparatus units, a group of circuit control devices at the control station, a group of circuit control devices associated with each apparatus unit, a first one of the circuit control devices associated with each apparatus unit corresponding to a first one of the circuit control devices at the control station, a second one of the circuit control devices associated with each apparatus unit corresponding to a second one of the circuit control devices at the control station, other of the circuit control devices associated with each of the apparatus units corresponding each to a separate one of other of the circuit control devices at the control station, actuating means associated with each group of circuit control devices for actuating when energized simultaneously over said communication channel the circuit control devices at the control station momentarily in sequence and actuating the circuit control devices associated with the apparatus units simultaneously with their corresponding circuit control devices at the control station over said communication channel, means individual to each actuating means responsive to the application of alternating current to the communication channel for effecting simultaneous connection of all of said actuating means thereto, selecting means at the control station corresponding to the separate apparatus units, means responsive to the actuation of any selected one of said selecting means for applying alternating current potential to the communication channel for operating all of said actuating means simultaneously, means responsive to the actuation by said actuating means of the circuit control device at the control station corresponding to the actuated one of the selecting means for removing the alternating current potential from the communication channel for stopping all of said actuating means, means responsive to the actuation of the circuit control device at the apparatus unit corresponding to the actuated one of the selecting means and the removal of the alternating current potential from the communication channel for again applying alternating current potential to the communication channel for again operating all of said actuating means simultaneously, means responsive to the actuation by said actuating means of the said first one of the circuit control devices for connecting the operating means of the apparatus unit corresponding to the actuated one of the selecting means for operation over said conducting channel from the control station, means for actuating the operating means of the selected apparatus unit over said conducting channel from the control station, means responsive to the actuation of the selected apparatus unit for again applying alternating current potential to the communication channel for causing all of said actuating means to reset their associated groups of circuit control devices for a subsequent selecting sequence operation, means whereby said second one of the circuit control devices and its corresponding circuit control devices are actuated during the said resetting operation, and means responsive to the actuation of said second one of the circuit control devices and its corresponding circuit control device associated with the actuated apparatus unit for actuating the indicating means at the control station for indicating the operation of the actuated apparatus unit at the control station.

4. In a supervisory control system, a communication channel extending between a control station and a plurality of remotely disposed stations, a pair of operating devices at each of the remote stations, each of said operating devices being responsive to direct current of different polarity, a group of circuit control devices at each of the stations, one of the circuit control devices at each of the remote stations corresponding to one of the circuit control devices at the control station, other of the circuit control devices at each remote station corresponding each to a separate one of other of the circuit control devices at the control station, actuating means associated with each group of circuit control devices responsive to the energization of the communication channel with alternating current for actuating the circuit control devices at the control station momentarily in sequence and actuating the circuit control devices at the remote stations simultaneously with their corresponding circuit control devices at the control station over said communication channel, selecting means at the control station corresponding to the separate remote stations, means responsive to the actuation of any selected one of said selecting means for applying alternating current potential to the communication channel for operating said actuating means simultaneously, means responsive to the actuation by said actuating means of the circuit control device at the control station corresponding to the actuated one of the selecting means for simultaneously stopping all of said actuating means by deenergizing the communication channel, means responsive to the actuation of the circuit control device at the remote station corresponding to the actuated one of the selecting means and the deenergization of the communication channel for again energizing said channel to again initiate operation of said actuating means, means responsive to the actuation by said actuating means of the said one of the circuit control devices for connecting the operating devices at the remote station corresponding to the actuated one of the selecting means for operation over said conducting channel, and means for selectively actuating from the control station one of the pair of operating devices at the selected station over the communication channel by applying direct current of different polarity to said channel.

5. In a supervisory control system, a communication channel extending between a control station and a plurality of remotely disposed stations, a pair of operating devices at each of the remote stations, a group of circuit control devices at each of the stations, one of the circuit control devices at each of the remote stations corresponding to one of the circuit control devices at the control station, other of the circuit control devices at each remote station corresponding each to a separate one of other of the circuit control devices at the control station, actuating means associated with each group of circuit control devices for actuating the circuit control devices at the control station momentarily in sequence and actuating the circuit control devices at the remote stations simultaneously with their corresponding circuit control devices at the control station over said communication channel, said actuating means being responsive to energization of said channel with alternating current, selecting means at the control station corresponding to the separate remote stations, means responsive to the actuation of any selected one of said selecting means for applying alternating current potential to said channel for operating said actuating means simultaneously, means responsive to the actuation by said actuating means of the circuit control device at the control station corresponding to the actuated one of the selecting means for stopping said actuating means by deenergizing said channel, means responsive to the actuation of the circuit control device at the remote station corresponding to the actuated one of the selecting means and the deenergization of the said channel for again operating said actuating means, means responsive to the actuation by said actuating means of the said one of the circuit control devices for deenergizing said channel and connecting the operating devices at the remote station corresponding to the actuated one of the selecting means for operation over said channel, means at the control station for selectively actuating one of the pair of operating devices at the selected station by applying direct current potential of different polarity to the communication channel, and means responsive to the operation of said selected operating device for reenergizing said channel with alternating current potential for causing the several actuating means to reset their associated groups of circuit control devices for a subsequent selecting sequence of operation.

6. In a supervisory control system, a communication channel extending between a control station and a plurality of apparatus units, operating means for each of the apparatus units, a group of circuit control devices at the control station, a group of circuit control devices associated with each apparatus unit, a first one of the circuit control devices associated with each apparatus unit corresponding to a first one of the circuit control devices at the control station, a second one of the circuit control devices associated with each apparatus unit corresponding to a second one of the circuit control devices at the control station, other of the circuit control devices associated with each of the apparatus units corresponding each to a separate one of other of the circuit control devices at the control station, actuating means associated with each group of circuit control devices for actuating the circuit control devices at the control station momentarily in sequence and actuating the circuit control devices associated with the apparatus units simultaneously with their corresponding circuit control devices at the control station over said communication channel, selecting means at the control station corresponding to the separate apparatus units, means responsive to the actuation of any selected one of said selecting means for operating said actuating means, means responsive to the actuation by said actuating means of the circuit control device at the control station corresponding to the actuated one of the selecting means for stopping said actuating means, means responsive to the actuation of the circuit control device at the apparatus unit corresponding to the actuated one of the selecting means and the stopping of the actuating means for again operating said actuating means, means responsive to the actuation by said actuating means of the said first one of the circuit control devices for connecting the operating means of the apparatus unit corresponding to the actuated one of the selecting means for operation over said conducting channel from the control station, means for actuating the operating means of the selected apparatus unit over said conducting channel from the control station, means responsive to the actuation of the selected apparatus unit for causing the several actuating means to reset their associated groups of circuit control devices for a subsequent selecting sequence operation, means whereby said second one of the circuit control devices and its corresponding circuit control devices are actuated during the said resetting operation, and means responsive to the actuation of said second one of the circuit control devices and its corresponding circuit control device associated with the actuated apparatus unit for indicating the operation of the actuated apparatus unit at the control station, means responsive to the operation of any apparatus unit other than by selective operation from the control station for operating said actuating means through said operating sequence of the groups of circuit control devices to a reset position for a subsequent sequence operation, and means responsive to the actuation of the circuit control devices associated with the operated one of the apparatus units and said first and second one of the circuit control devices for indicating the operation of the apparatus unit at the control station.

7. In a supervisory control system, a conducting channel extending between a control station and a plurality of apparatus units, operating means for each of the apparatus units, a group of circuit control devices at the control station, a group of circuit control devices associated with each apparatus unit, one of the circuit control devices associated with each apparatus unit corresponding to one of the circuit control devices at the control station, other of the circuit control devices associated with each of the apparatus units corresponding each to a separate one of other of the circuit control devices at the control station, actuating means associated with each group of circuit control devices for actuating the circuit control devices at the control station momentarily in sequence and actuating the circuit control devices associated with the apparatus units simultaneously with their corresponding circuit control devices at the control station over said conducting channel, selecting means at the control station corresponding to the separate apparatus units, means responsive to the actuation of a selected one of said selecting means for operating said actuating means, means responsive to the actuation by said actuating means of the circuit control device at the control station corresponding to the actuated one of the selecting means for stopping said actuating means, means responsive to the actuation of the circuit control device at the apparatus unit corresponding to the actuated one of the selecting means and the stopping of the actuating means for again operating said actuating means, and means responsive to the actuation by said actuating means of the said one circuit control device for connecting the operating means of the apparatus unit corresponding to the actuated one of the selecting means for operation over said conducting channel from the control station, means for actuating the operating means of the said selected apparatus unit over said conducting channel from the control station, means responsive to the actuation of said selected apparatus unit for causing the several actuating means to reset their associated groups of circuit control devices for a subsequent selecting sequence of operation, and means for resetting the groups of circuit control devices for a subsequent sequence of operation without actuating the operating means of the selected apparatus unit.

8. In a supervisory control system, a communication channel extending between a control station and a plurality of apparatus units, a group of circuit control devices at the control station, a group of circuit control devices associated with each apparatus unit, one of the circuit control devices associated with each apparatus unit corresponding to one of the circuit control devices at the control station, other of the circuit control devices associated with each of the apparatus units corresponding each to a separate one of other of the circuit control devices at the control station, actuating means associated with each group of circuit control devices for actuating, when energized simultaneously, the circuit control devices at the control station momentarily in sequence and the circuit control devices associated with the apparatus units simultaneously with their corresponding circuit control devices at the control station, relay means responsive to alternating current in the communication channel for energizing and deenergizing said separate actuating means simultaneously, selecting means at the control station corresponding to the separate apparatus units, means responsive to the actuation of a selected one of said selecting means for applying alternating current potential to the communication channel, means responsive to the actuation by said actuating means of the circuit control device at the control station corresponding to the actuated one of the selecting means for removing the alternating current potential from the communication channel, means responsive to the actuation of the circuit control device at the apparatus unit corresponding to the actuated one of the selecting means and the removal of alternating current potential from the communication channel for again applying alternating current potential to the communication channel, direct current responsive means at the apparatus units for operating the apparatus units, means responsive to the actuation by said actuating means of the said one circuit control device for again disconnecting the alternating current potential from the communication channel and connecting the direct current responsive means associated with the selected apparatus unit to respond to direct current potential in the communication channel, and means for applying direct current potential to the communication channel from the control station.

9. In a supervisory control system, a communication channel extending between a control station and a plurality of apparatus units, a group of circuit control devices at the control station, a group of circuit control devices associated with each apparatus unit, one of the circuit control devices associated with each apparatus unit corresponding to one of the circuit control devices at the control station, other of the circuit control devices associated with each of the apparatus units corresponding each to a separate one of other of the circuit control devices at the control station, actuating means associated with each group of circuit control devices for actuating, when energized simultaneously, the circuit control devices at the control station momentarily in sequence and the circuit control devices associated with the apparatus units simultaneously with their corresponding circuit control devices at the control station, relay means responsive to alternating current in the communication channel for energizing and deenergizing said separate actuating means simultaneously, selecting means at the control station corresponding to the separate apparatus units, means responsive to the actuation of a selected one of said selecting means for applying alternating current potential to the communication channel, means responsive to the actuation by said actuating means of the circuit control device at the control station corresponding to the actuated one of the selecting means for removing the alternating current potential from the communication channel, means responsive to the actuation of the circuit control device at the apparatus unit corresponding to the actuated one of the selecting means and the removal of alternating current potential from the communication channel for again applying alternating current potential to the communication channel, direct current responsive means at the apparatus units for operating the apparatus units, means responsive to the actuation by said actuating means of the said one circuit control device for again disconnecting the alternating current potential from the communication channel and connecting the direct current responsive means associated with the selected apparatus unit to respond to direct current potential in the communication channel, means for applying direct current potential to the communication channel from the control station, and means responsive to the operation of the selected apparatus unit for causing said actuating means to reset their associated groups of circuit control devices for a subsequent selecting sequence of operation.

10. In a supervisory control system, a conducting channel extending between a control station and a plurality of apparatus units, operating means for each of the apparatus units, a group of circuit control devices at the control station, a group of circuit control devices associated with each apparatus unit, one of the circuit control devices associated with each apparatus unit corresponding to one of the circuit control devices at the control station, other of the circuit control devices associated with each of the apparatus units corresponding each to a separate one of other of the circuit control devices at the control station, actuating means associated with each group of circuit control devices for actuating the circuit control devices at the control station momentarily in sequence and actuating the circuit control devices associated with the apparatus units simultaneously with their corresponding circuit control devices at the control station over said conducting channel, selecting means at the control station corresponding to the separate apparatus units, means responsive to the actuation of a selected one of said selecting means for operating said actuating means, means responsive to the actuation by said actuating means of the circuit control device at the control station corresponding to the actuated one of the selecting means for stopping said actuating means, means responsive to the actuation of the circuit control device at the apparatus unit corresponding to the actuated one of the selecting means and the stopping of the actuating means for again operating said actuating means, means responsive to the actuation by said actuating means of the said one circuit control device for connecting the operating means of the apparatus unit corresponding to the actuated one of the selecting means for operation over said conducting channel from the control station, and means responsive to the resetting of the circuit control devices for indicating the operation of the apparatus unit at the control station.

11. In a supervisory control system, a conducting channel extending between a control station and a plurality of apparatus units, a group of circuit control devices at the control station, a group of circuit control devices associated with each apparatus unit, a first and a second one of the circuit control devices associated with each apparatus unit corresponding to a first and a second one of the circuit control devices at the control station, respectively, other of the circuit control devices associated with each of the apparatus units corresponding each to a separate one of other of the circuit control devices at the control station, actuating means associated with each group of circuit control devices for actuating, when energized simultaneously, the circuit control devices at the control station momentarily in sequence and the circuit control devices associated with the apparatus units simultaneously with their corresponding circuit control devices at the control station, relay means responsive to alternating current in the conducting channel for energizing and deenergizing said separate actuating means simultaneously, selecting means at the control station corresponding to the separate apparatus units, means responsive to the actuation of a selected one of said selecting means for applying alternating current potential to the conducting channel, means responsive to the actuation by said actuating means of the circuit control device at the control station corresponding to the actuated one of the selecting means for removing the alternating current potential from the conducting channel, means responsive to the actuation of the circuit control device at the apparatus unit corresponding to the actuated one of the selecting means and the removal of alternating current potential from the conducting channel for again applying alternating current potential to the conducting channel, direct current responsive means at the apparatus units for operating the apparatus units, means responsive to the actuation by said actuating means of the said first circuit control device for again disconnecting the alternating current potential from the conducting channel and connecting the direct current responsive means associated with the selected apparatus unit to respond to direct current potential in the conducting channel, means at the control station for applying direct current potential to the conducting channel to thereby operate the selected apparatus unit, means responsive to the operation of the selected apparatus unit for again applying alternating current potential to the conducting channel, indicating means at the control station responsive to the direct current potential on the conducting channel and the actuation of the said second one of the circuit control devices at the control station, means responsive to the actuation of the said second one of the circuit control devices at the selected station for removing the alternating current potential from and applying a direct current potential to the conducting channel, and means responsive to the actuation of the said second circuit control devices at all of the stations for causing the several actuating means to reset the several associated groups of circuit control devices for a subsequent operation sequence.

12. In a supervisory control system, a conducting channel extending between a control station and a plurality of apparatus units, a group of circuit control devices at the control station, a group of circuit control devices associated with each apparatus unit, a first and a second one of the circuit control devices associated with each apparatus unit corresponding to a first and a second one of the circuit control devices at the control station, respectively, other of the circuit control devices associated with each of the apparatus units corresponding each to a separate one of other of the circuit control devices at the control station, actuating means associated with each group of circuit control devices for actuating, when energized simultaneously, the circuit control devices at the control station momentarily in sequence and the circuit control devices associated with the apparatus units simultaneously with their corresponding circuit control devices at the control station, relay means responsive to alternating current in the conducting channel for energizing and deenergizing said separate actuating means simultaneously, selecting means at the control station corresponding to the separate apparatus units, means responsive to the actuation of a selected one of said selecting means for applying alternating current potential to the conducting channel, means responsive to the actuation by said actuating means of the circuit control device at the control station corresponding to the actuated one of the selecting means for removing the alternating current potential from the conducting channel, means responsive to the actuation of the circuit control device at the apparatus unit corresponding to the actuated one of the selecting means and the removal of alternating current potential from the conducting channel for again applying alternating current potential to the conducting channel, direct current responsive means at the apparatus units for operating the apparatus units, means responsive to the actuation by said actuating means of the said first circuit control device for again disconnecting the alternating current potential from the conducting channel and connecting the direct current responsive means associated with the selected apparatus unit to respond to direct current potential in the conducting channel, means at the control station for applying direct current potential to the conducting channel to thereby operate the selected apparatus unit, means responsive to the operation of the selected apparatus unit for again applying alternating current potential to the conducting channel, indicating means at the control station responsive to the direct current potential on the conducting channel and the actuation of the said second one of the circuit control devices at the control station, means responsive to the actuation of the said second one of the circuit control devices at the selected station for removing the alternating current potential from and applying a direct current potential to the conducting channel, means responsive to the actuation of the said second circuit control devices at all of the stations for causing the several actuating means to reset the several associated groups of circuit control devices for a subsequent operation sequence, and means at the control station for applying alternating current potential to the conducting channel to thereby reset the groups of circuit control devices for a subsequent operation sequence after the selection of an apparatus unit without operating the apparatus unit if desired.

13. In a supervisory control system, a conducting channel extending between a control station and a plurality of remotely disposed stations, a pair of operating devices at certain of the remote stations, a group of circuit control devices at each of the stations, a first and a second of the circuit control devices at each of the remote stations corresponding to a first and a second of the circuit control devices at the control station, respectively, other of the circuit control devices at each of the remote stations corresponding each to a separate one of other of the circuit control devices at the control station, first and second polarity responsive relay means at each of the stations responsive to potentials of opposite polarities on the conducting channel and thus both responsive to alternating current potential on the conducting channel, actuating means at each station responsive to the actuation of both of the polarity responsive relay means at the station for actuating the circuit control devices at the control station in sequence and the circuit control devices at the remote stations simultaneously with their corresponding circuit control devices at the control station, selecting means at the control station corresponding to the separate remote stations, means responsive to the actuation of any selected one of said selecting means for applying alternating current potential to the conducting channel, means responsive to the actuation by said actuating means of the circuit control device at the control station corresponding to the actuated one of the selecting means for removing the alternating current potential from the conducting channel, means responsive to the actuation of the circuit control device at the selected station corresponding to the actuated one of the selecting means and the release of the polarity responsive relays at the selected station for again applying alternating current potential to the conducting channel, means responsive to the actuation by said actuating means of the said first circuit control device at the selected station for again disconnecting the alternating current potential from the conducting channel and connecting said operating devices at the selected remote station to be selectively operated by the actuation of a selected single one of the polarity responsive relays at the selected station, means at the control station for selectively applying a direct current potential to the conducting channel of such polarity as to selectively operate the polarity responsive relays at the remote stations, means responsive to the operation of the selected operating device for again applying an alternating current potential to the conducting channel, means responsive to the actuation by said actuating means of the said second circuit control device at the selected station for removing the alternating current potential from the conducting channel, selective indicating means at the control station responsive to the selective actuation of the polarity responsive relay means at the control station and the actuation of the second circuit control device at the control station, means responsive to the operation of the selected operating device for applying a direct current potential to the conducting channel of such polarity as to cause the polarity responsive relay means at the control station to selectively actuate the indicating means corresponding to the selected operating device, and means responsive to the actuation of the said second circuit control devices at the several stations for causing the actuating means at the several stations to reset their associated groups of circuit control devices for a subsequent operating sequence.

14. In a supervisory control system, a conducting channel extending between a control station and a plurality of remotely disposed stations, a pair of operating devices at certain of the remote stations, a group of circuit control devices at each of the stations, a first and a second of the circuit control devices at each of the remote stations corresponding to a first and a second of the circuit control devices at the control station, respectively, other of the circuit control devices at each of the remote stations corresponding each to a separate one of other of the circuit control devices at the control station, first and second polarity responsive relay means at each of the stations responsive to potentials of opposite polarities on the conducting channel and thus both responsive to alternating current potential on the conducting channel, actuating means at each station responsive to the actuation of both of the polarity responsive relay means at the station for actuating the circuit control devices at the control station in sequence and the circuit control devices at the remote stations simultaneously with their corresponding circuit control devices at the control station, selecting means at the control station corresponding to the separate remote stations, means responsive to the actuation of any selected one of said selecting means for applying alternating current potential to the conducting channel, means responsive to the actuation by said actuating means of the circuit control device at the control station corresponding to the actuated one of the selecting means for removing the alternating current potential from the conducting channel, means responsive to the actuation of the circuit control device at the selected station corresponding to the actuated one of the selecting means and the release of the polarity responsive relays at the selected station for again applying alternating current potential to the conducting channel, means responsive to the actuation by said actuating means of the said first circuit control device at the selected station for again disconnecting the alternating current potential from the conducting channel and connecting said operating devices at the selected remote station to be selectively operated by the actuation of a selected single one of the polarity responsive relays at the selected station, means at the control station for selectively applying a direct current potential to the conducting channel of such polarity as to selectively operate the polarity responsive relays at the remote stations, means responsive to the operation of the selected operating device for again applying an alternating current potential to the conducting channel, means responsive to the actuation by said actuating means of the said second circuit control device at the selected station for removing the alternating current potential from the conducting channel, selective indicating means at the control station responsive to the selective actuation of the polarity responsive relay means at the control station and the actuation of the second circuit control device at the control station, means responsive to the operation of the selected operating device for applying a direct current potential to the conducting channel of such polarity as to cause the polarity responsive relay means at the control station to selectively actuate the indicating means corresponding to the selected operating device, means responsive to the actuation of the said second circuit control devices at the several stations for causing the actuating means at the several stations to reset their associated groups of circuit control devices for a subsequent operating sequence, and means at the control station for applying alternating current potential to the conducting channel to thereby reset the groups of circuit control devices for a subsequent operation sequence after selection of a remote station without operating the operating devices at the remote station if desired.

15. In a supervisory control system, a conducting channel extending between a control station and a plurality of remotely disposed stations, a pair of operating devices at certain of the remote stations, a group of circuit control devices at each of the stations, a first and a second of the circuit control devices at each of the remote stations corresponding to a first and a second of the circuit control devices at the control station, respectively, other of the circuit control devices at each of the remote stations corresponding each to a separate one of other of the circuit control devices at the control station, first and second polarity responsive relay means at each of the stations responsive to potentials of opposite polarities on the conducting channel and thus both responsive to alternating current potential on the conducting channel, actuating means at each station responsive to the actuation of both of the polarity responsive relay means at the station for actuating the circuit control devices at the control station in sequence and the circuit control devices at the remote stations simultaneously with their corresponding circuit control devices at the control station, selecting means at the control station corresponding to the separate remote stations, means responsive to the actuation of any selected one of said selecting means for applying alternating current potential to the conducting channel, means responsive to the actuation by said actuating means of the circuit control device at the control station corresponding to the actuated one of the selecting means for removing the alternating current potential from the conducting channel, means responsive to the actuation of the circuit control device at the selected station corresponding to the actuated one of the selecting means and the release of the polarity responsive relays at the selected station for again applying alternating current potential to the conducting channel, means responsive to the actuation by said actuating means of the said first circuit control device at the selected station for again disconnecting the alternating current potential from the conducting channel and connecting said operating devices at the selected remote station to be selectively operated by the actuation of a selected single one of the polarity responsive relays at the selected station, means at the control station for selectively applying a direct current potential to the conducting channel of such polarity as to selectively operate the polarity responsive relays at the remote stations, means responsive to the operation of the selected operating device for again applying an alternating current potential to the conducting channel, means responsive to the actuation by said actuating means of the said second circuit control device at the selected station for removing the alternating current potential from the conducting channel, selective indicating means at the control station responsive to the selective actuation of the polarity responsive relay means at the control station and the actuation of the second circuit control device at the control station, means responsive to the operation of the selected operating device for applying a direct current potential to the conducting channel of such polarity as to cause the polarity responsive relay means at the control station to selectively actuate the indicating means corresponding to the selected operating device, means responsive to the actuation of the said second circuit control devices at the several stations for causing the actuating means at the several stations to reset their associated groups of circuit control devices for a subsequent operating sequence, an apparatus unit at each of the remote stations selectively actuable and releasable by the respective operating devices at the station, means responsive to the release of an actuated apparatus unit other than by selective control from the control station for applying an alternating current potential to the conducting channel, means responsive to the actuation of the second circuit control device at the station at which the apparatus unit has been released for removing the alternating current potential from the conducting channel and applying a direct current potential to the conducting channel of such polarity as to cause the polarity responsive relay means at the control station to selectively actuate the indicating means corresponding to the position of the released apparatus unit, and means responsive to the actuation of the second circuit control device at each of the several stations for resetting the several groups of circuit control devices for a subsequent operation sequence.

MAURICE E. REAGAN.